US006227691B1

(12) United States Patent
Hogrefe et al.

(10) Patent No.: US 6,227,691 B1
(45) Date of Patent: May 8, 2001

(54) HEADLIGHT ARRANGEMENT FOR MOTOR VEHICLE

(75) Inventors: Henning Hogrefe, Walddorfhaeslach; Friedemann Schlienz, Tuebungen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/348,589

(22) Filed: Jul. 6, 1999

(30) Foreign Application Priority Data

Jul. 7, 1998 (DE) .............................................. 198 30 298

(51) Int. Cl.[7] ............................... F21V 14/08; B60Q 1/04

(52) U.S. Cl. ........................... 362/539; 362/465; 362/514

(58) Field of Search .................................... 362/276, 280, 362/281, 282, 284, 322, 323, 324, 464, 465, 467, 512, 513, 514, 539

(56) References Cited

U.S. PATENT DOCUMENTS 1,305,498 * 6/1919 Schroeder .
1,834,542 * 12/1931 Karlebo .
4,987,521 * 1/1991 Fratty et al. ......................... 362/284
5,130,903 * 7/1992 Fast et al. ............................ 362/284

FOREIGN PATENT DOCUMENTS 43 07 110 A1 9/1994 (DE) .

* cited by examiner

*Primary Examiner*—Y. Quach
(74) *Attorney, Agent, or Firm*—Michael J. Striker

(57) ABSTRACT

A headlight arrangement of a vehicle having a reflector subdivided into a plurality of reflector regions, a light source arranged in a region of an apex of the reflector so that a light emitted by the light source is reflected by the reflector onto a roadway in front of the vehicle, at least one screening device associated with at least one of the reflector regions, the screening device being adjustable between a position in which the light emitted by the light source can reach a selected one of the reflector regions, and a position in which a light emitted by the light source is at least partially screened from a selected one of the reflector regions, and a control unit which controls the screening device in dependence on vehicle sensor signals and adjusts the screening device so that in each vehicle situation an optimal light distribution is provided.

15 Claims, 3 Drawing Sheets

HEADLIGHT ARRANGEMENT FOR MOTOR VEHICLE

BACKGROUND OF THE INVENTION

The present invention relates to a headlight arrangement for a motor vehicle.

More particularly, it relates to such a headlight arrangement which has a reflector subdivided into several reflector regions, a light source arranged in the region of the apex of the reflector, so that light which is emitted by the light source is reflected by the reflector on a roadway in front of the motor vehicle, and at least one screening device associated with at least one selected reflector region. The screening device is adjustable between a passage position in which the light emitted by the light source can reach the selected reflector region, and a screening position in which it screens the reflector region from the light emitted by the light source.

In such headlight arrangements, the reflector can be subdivided however into several desired functional reflector regions. The subdivision must not be visible from outside, for example as steps between the reflector regions. Such headlight arrangement is disclosed for example in the German patent document DE 43 07 110 A1. The lateral reflector regions of the open headlight arrangement disclosed in this reference influence the side dispersion, the upper and lower reflector region influence the pre-field illumination.

For switching of the known headlight arrangement from the right side traffic to the left side traffic and vice versa, the headlight arrangement is provided with at least one screening device which screens the lateral reflector regions from the light source so that an asymetric illumination intensity distribution is produced with the bright-dark limit increasing toward the roadway edge at the road side itself (in other words right for the right side traffic and left for the left side traffic).

While the screening devices in accordance with the prior art can be switched between the passage position and the screening position, an intermediate position is not provided in them. The screening device disclosed in the German patent document DE 43 07 110 A1 can be switched between the two positions for the right side traffic and left side traffic. The headlight arrangement has the same statistic light distribution for the right side traffic and the left side traffic. However, for an asymmetrical illumination intensity distribution the bright-dark limit at the roadway side raising toward the roadway edge can be switched for the right side traffic to the right and for the left side traffic to the left.

It has been however recognized that there is no optimal statistic illumination which can be correct for all road and traffic situations. For example, during driving on a speedway with a high speed another optimal light distribution is required by governmental regulations that during driving with a lower speed. Therefore, a headlight arrangement would be desirable, in which the light distribution can be controlled adaptively, or in other words in correspondence with the road and traffic situations.

A so-called curve headlight is known from the prior art and has turnable reflectors for variation of the dispersion width. With such a curve headlight the roadway edges during driving over curves can be illuminated wider. Moreover, free-standing individual headlights are known, which are arranged at the right side and the left side of the motor vehicle and provide illumination in the side regions. By turning on and turning off of the individual headlights, the side width of the vehicle can be illuminated as desired.

In the known curve headlights disclosed in the prior art, the construction is substantially large because of the adjustment mechanism and the turnable reflectors. Moreover they take into consideration only the steering angle as a single control value for the light distribution. Finally, the turnable reflectors are subjected to wear and must be maintained in regular time intervals. Due to the turnable reflectors and the broadly fluctuating environmental conditions (temperature, air moisture, dirt) in the headlights, the known curve headlight is especially sensitive.

The lateral single headlights in accordance with the prior art has a disadvantage that they are fixedly mounted on the motor vehicle. They have no flexibility with regard to the light distribution. They are either turned on and illuminate the side regions or they are turned off and do not illuminate the side regions. Intermediate positions which can be desirable for illumination of only predetermined parts of the side regions for illumination of side regions with variable intensity, are not provided. The known single headlights require a mounting space in the motor vehicle.

SUMMARY OF THE INVENTION

Accordingly, it is an object of the present invention to provide a headlight arrangement for a vehicle, which avoids the disadvantages of the prior art.

More particularly, it is an object of present invention to provide a headlight arrangement for a vehicle, which makes possible an adaptive light distribution, has a simple construction, operates reliably and at the same time has small dimensions.

In keeping with these objects and with others which will become apparent hereinafter, one feature of present invention resides, briefly stated, in a headlight arrangement which it has a control unit controlling the screening device in dependence on vehicle sensor signals and the screening device is adjusted steplessly so that for each vehicle situation an optimal light distribution is provided.

Vehicle sensor signals which can be considered for use for the control unit to control the screening device include for example the vehicle speed, the motor rotary speed, the selected gear, the steering angle, the vehicle inclination, the yawing rate, the spring path, the adjustment of the gas pedal, the adjustment of the brakes, the outside temperature and/or the air moisture. In a particularly advantageous manner, as a vehicle sensor signal also a street traffic can be introduced, which is determined by a navigation system. Basically, all physical conditions which can have an influence on the vehicle condition can be determined by a sensor and supplied to the control unit. From the steering angle course in connection with the vehicle speed, for example the roadway course can be determined. In particular, curves can be recognized and the headlight arrangement can illuminate the curves correspondingly. From the spring path, for example the roadway quality can be determined and the light distribution can be correspondingly controlled.

The control unit determines from the vehicle sensor signals the vehicle situation and correspondingly controls the screening device. For example low speeds mean frequently changing actuation of the gas pedal and the brake pedal and frequent curves during a city driving. High speeds over a long time interval with insignificant steering wheel action means the speedway driving, and corresponding greater steering wheel action means driving on a highway. Further vehicle situations include for example the vehicle inclination about the longitudinal axis during driving over curves, or the vehicle inclination about the transverse axis during acceleration or braking. Moreover, the driving over curves is a vehicle situation which requires a special light distribution. Finally, the exterior conditions, weather and environmental conditions, produce a vehicle situation which requires a special light distribution. An optimal light distribution means that, depending on the corresponding vehicle situation, the prescribed and standard requirements are fulfilled on the one hand, but on the other hand with regard to the light distribution, they are completely satisfied.

The inventive headlight arrangement can control the light distribution correctly in accordance with the situation, depending on the street, driver, and vehicle situation, and therefore guarantees a substantial contribution to improvement of the street safety. At lower speeds, the side region of the vehicle and in some cases also the adjoining region in front of the vehicle are illuminated better, while during higher speeds the dispersion width comes back and therefore the visibility range along the roadway must be substantially increased. An amplified side light is also advantageous during deflecting processes on intersections as well as during driving over curved paths.

The invention in particular deals with headlight arrangements, in which the light distribution is produced completely or at least substantially by the reflector. During this process the pre-field illumination is conventionally influenced by the reflector regions above and below the light source and the side dispersion by the reflector regions laterally of the light source. For reducing the side dispersion in the inventive headlight arrangement, the screening device screens the lateral reflector regions against the light produced by the light source at least partially. For varying of the pre-field illumination, the screening device must be adjusted so that the upper and/or reflector regions are screened from the light emitted by the light source at least partially. The screening device can be adjusted so that only a part of the reflector region is screened from the light emitted by the light source. Thereby the side dispersion or the pre-field illumination can be varied in any desired way.

The inventive headlight arrangement also provides a stepless adaptive light distribution. It has a simple construction, operates reliably and is of a particularly small size.

In the practice, the side reflector regions are conventionally not screened completely, since on the other regions the range maximum and the bright-dark limit are clearly jointly formed. However, it is desirable to have the utilization regions, in which the screening device preferably screens almost the whole selected reflector region.

In accordance with a preferable further embodiment of the invention, the screening device can be formed as at least one light-impermeable shield. The shield is associated at least with a selected reflector region. It is steplessly adjustable between a position in which the light emitted by the light source reaches the selected reflector region, and a position in which the selected reflector region is screened from the light emitted by the light source.

For adjusting the shield, preferably it is displaced parallel to the optical axis of the headlight arrangement. Alternatively, the shield can be turned about the optical axis of the headlight arrangement or turned about the axis parallel to it.

In accordance with another advantageous further feature of the present invention, the contour of the shield can be shaped in correspondence with the geometry of the selected reflector region. Thereby the selected reflector region or only certain parts of the reflector region can be curved by the shield. If for example the side dispersion of the inventive headlight arrangement must be reduced, then the shield must be formed so that only the lateral reflector regions which produce the side dispersion are covered. The upper and lower reflector regions which serve for pre-field illumination, must not be covered by the shield.

In accordance with another advantageous further feature of present invention, the screening device is formed as at least one reflector element. In this way the light rays which are screened from the selected reflector region are not only absorbed but also reflected to the remaining reflector regions or reflected directly into a pre-selected direction on the roadway in front of the vehicle, and they can be used for the illumination of the roadway in front of the vehicle. The inventive headlight device with such design has an especially high efficiency.

Advantageously, the reflector element is turnable about the optical axis of the headlight arrangement or about an axis which is parallel to it. The reflector element is preferably arranged in front of a remaining reflector region in the passage position, in which the light emitted by the light source is supplied to the selected reflector region. In the screening position in which the reflector element screens the light of the light source from the selected reflector region, the reflector element is located in front of this reflector region. The light oriented to this reflector region is reflected by the reflector element for optimization of the light distribution, directly or indirectly over the remaining reflector region onto the roadway in front of the vehicle.

When the reflector is subdivided for example into four reflector regions, both lateral reflector regions influence the lateral dispersion, while the upper and lower reflector regions influence the pre-field illumination. In this construction two reflector elements are located above and below the light source in front of the remaining reflector regions providing the pre-field illuminations. In this position the reflector elements have only insignificant little influence on the pre-field illumination and the side dispersion. The farther the reflector elements are turned however, in the horizontal position in front of the selected reflector region which are important for the side dispersion, the more they screen the width-dispersing lateral reflector regions of the reflector. The lateral reflector regions are replaced, with increasing horizontal position of the reflector elements, by the reflector elements which provide concentrated dispersion. Thereby the light oriented on the selected lateral reflector element is screened by it and, in advantageous manner deviated to another light distribution. The screened light is available as before for illumination purposes.

The light source of the inventive headlight arrangement is preferably formed as a gas discharge lamp. Due to the high light density of gas discharge lamps, the inventive headlight arrangement can be formed especially small, with the same remaining light intensity.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
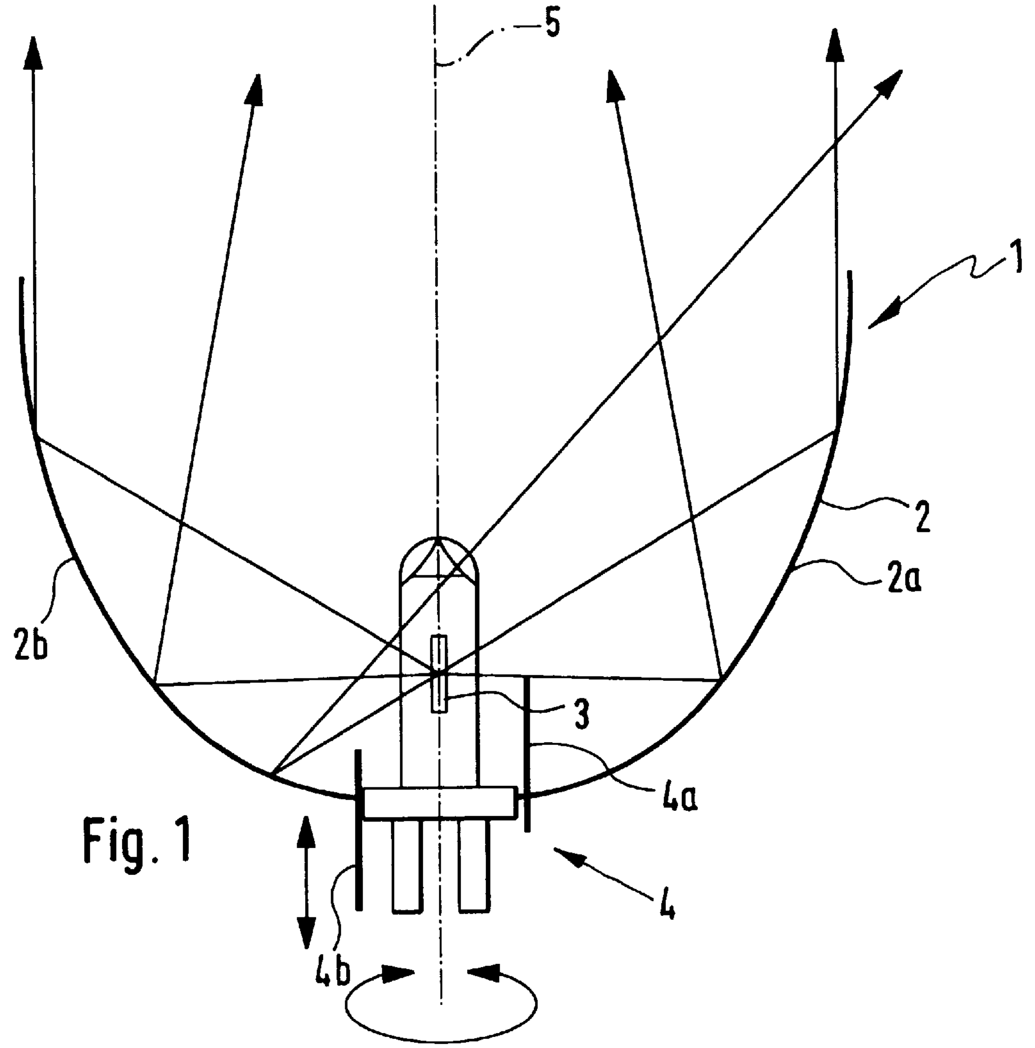
FIG. 1 is a view showing an inventive headlight arrangement in accordance with a first embodiment in accordance, in a section.

A headlight arrangement for a motor vehicle shown in FIG. 1 is identified as a whole with reference numeral 1. It has a reflector 2 and a light source 3 which is arranged in the region of an apex of the reflector 2. The reflector 2 is subdivided into four reflector regions 2*a*, 2*b*, 2*c*, 2*d*.

The lateral reflector regions 2*a*, 2*b* influence the lateral dispersion, while the upper and lower reflector regions 2*c*, 2*d* influence the pre-field illumination. The light source 3 is formed as a gas discharge lamp. The light emitted by the light source 3 is reflected by the reflector 2 onto the roadway in front of the motor vehicle. A screening device 4 is arranged around the light source 3.

Figure 2:
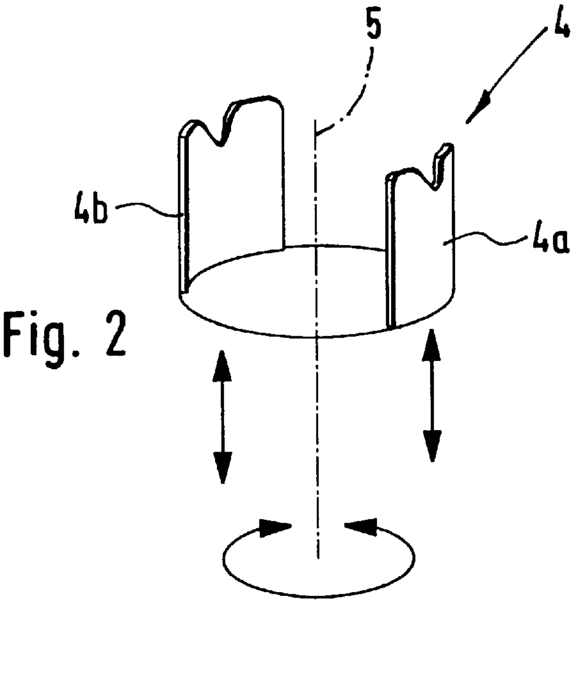
FIG. 2 is a perspective view of the screening device of the inventive headlight arrangement of FIG. 1.

The screening device is associated with the lateral reflector regions 2*a*, 2*b*. The screening device is adjustable between a passage position in which the light emitted by the light source 3 reaches the lateral reflector regions 2*a*, 2*b* and a screening position in which it screens the light emitted by the light source 3 from the lateral reflector regions 2*a*, 2*b*. The adjustment is performed steplessly. The screening device has two individually adjustable, light-impermeable screens 4*a*, 4*b*. The screens 4*a*, 4*b* are displaceable parallel to the optical axis 5 of the headlight arrangement 1 and/or turnable about the optical axis 5. The screening device 4 is shown in FIG. 2 on an enlarged scale.

The headlight arrangement 1 has a not shown control unit which controls the screening device 4 independently from the vehicle sensor signals. The control unit steplessly adjusts the screening device 4, so that in each vehicle situation an optimal light distribution is provided. The contour of the shields 4*a*, 4*b* is shaped in correspondence with the geometry of the lateral reflector regions 2*a*, 2*b*, so that the lateral reflector regions 2*a*, 2*b* or only certain parts of the reflector regions 2*a*, 2*b* are covered by the shields 4*a*, 4*b*.

Figure 3:
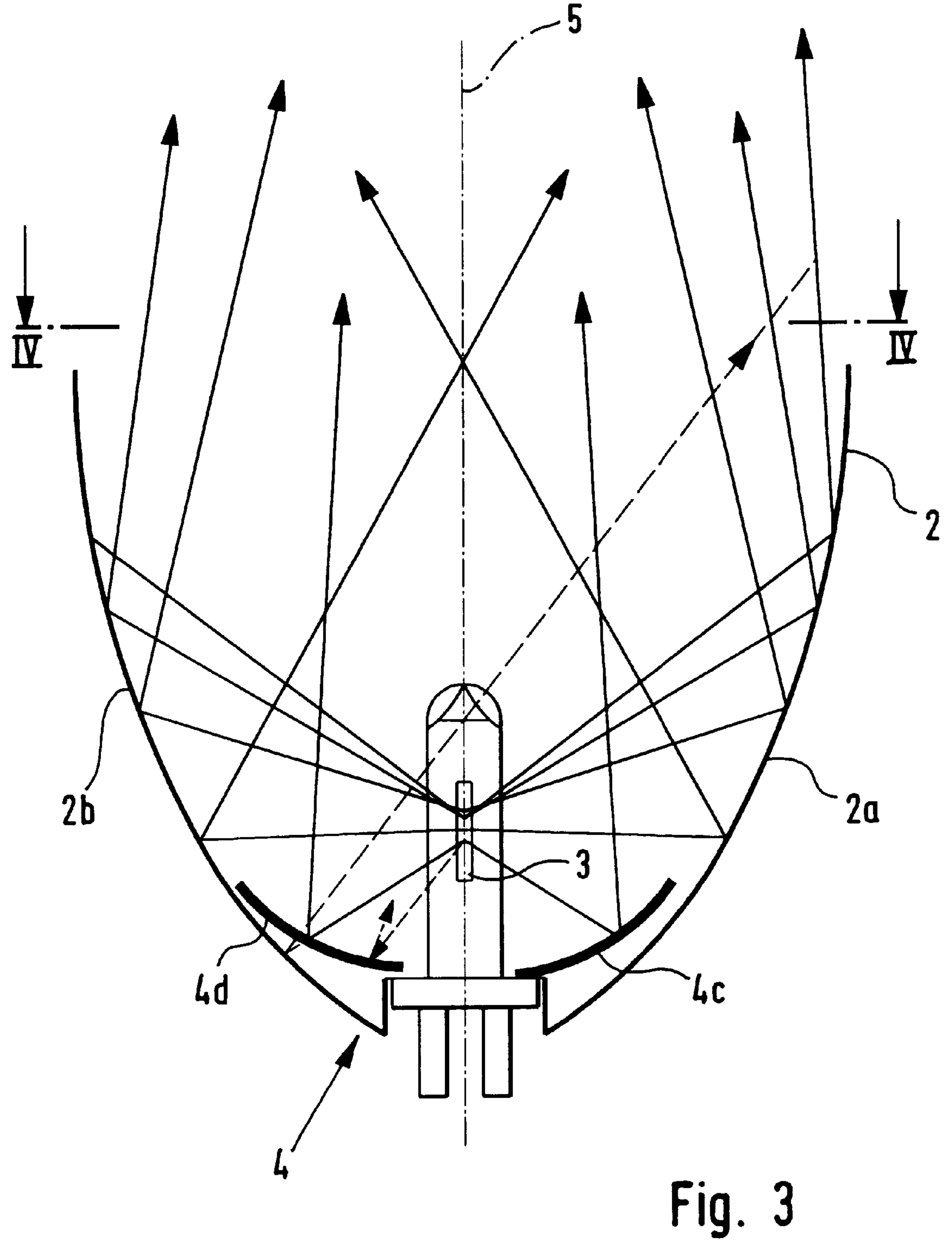
FIG. 3 is a view showing an inventive headlight arrangement in accordance with a second embodiment, in a section.
Figure 4:
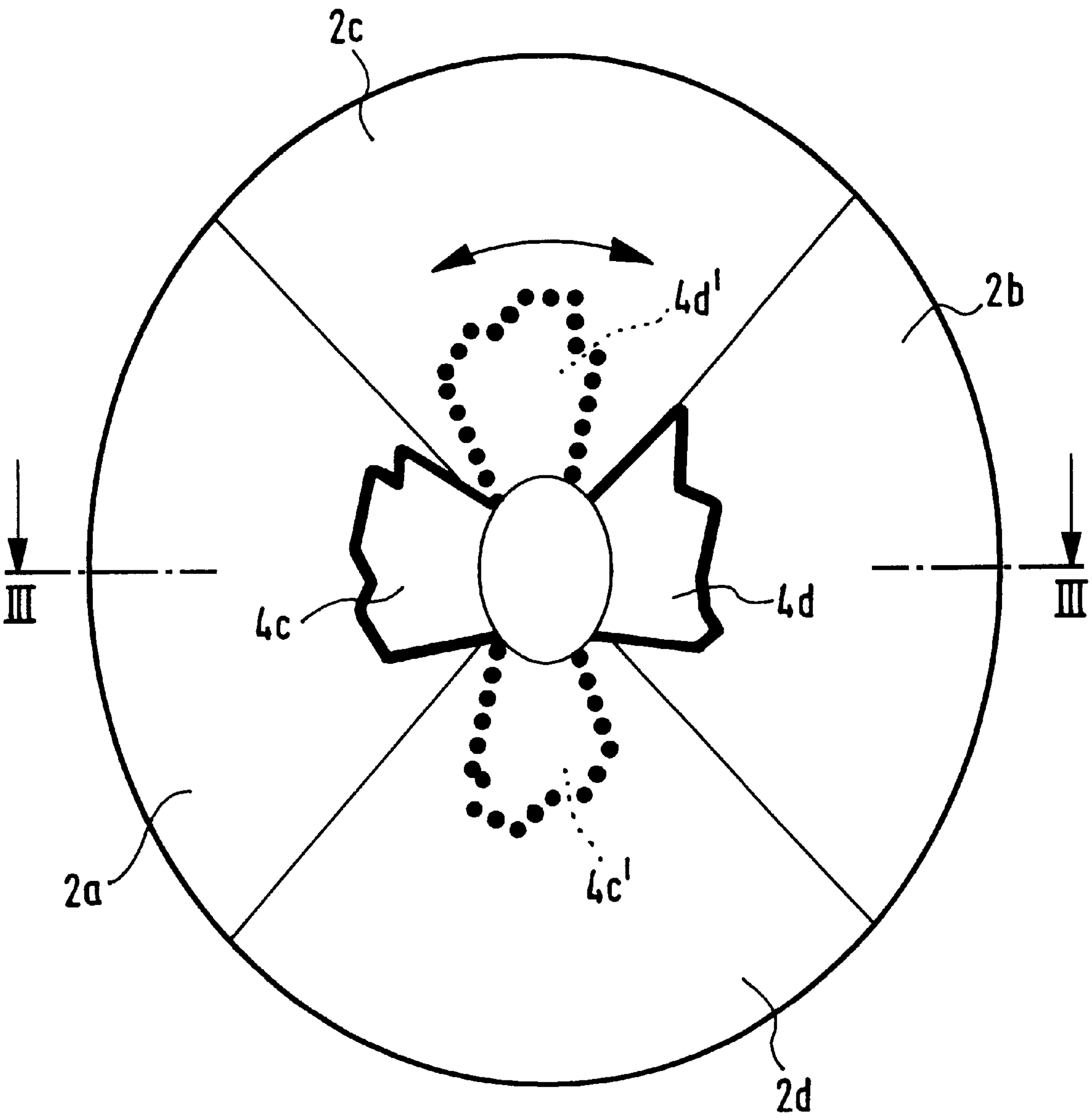
FIG. 4 is a front view of the inventive headlight arrangement of FIG. 3.

A headlight arrangement 1 in accordance with a second embodiment of the present invention is shown in FIG. 3. The screening device 4 has in this embodiment two reflector elements 4*c*, 4*d*. The reflector elements 4*c*, 4*d* are turnable about the optical axis 5 of the headlight arrangement 1. In the passage position in which the light emitted by the light source 3 can pass to the lateral reflector regions 2*a*, 2*b*, the reflector elements 4*c*, 4*d* are arranged in front of the upper and lower reflector regions 2*c*, 2*d*, as shown by broken lines for the reflector elements 4*c*', 4*d*' in FIG. 4. The light rays of the light source 3 in the passage position are reflected by the lateral reflector regions 2*a*, 2*b* as shown by broken lines in FIG. 3 for the course of the rays.

In the screening position in which the reflector elements 4*c*, 4*d* screen the light emitted by the light source 3 from the lateral reflector regions 2*a*, 2*b*, the reflector elements 4*c*, 4*d* are arranged in front of the reflector regions 2*a*, 2*b*. The shape of the reflector 2 of the headlight arrangement 1 deviates from the shape of the reflector elements 4*c*, 4*d* so that the light rays of the light source 3 oriented to the reflector regions 2*a*, 2*b* are reflected in the screening device by the reflector elements 4*c*, 4*d* in another reflection direction, as shown in FIG. 3 by solid lines illustrating the course of rays. The light rays in the screening position are reflected by the reflector elements 4*c*, 4*d* for optimization of the light distribution, directly or indirectly via the upper and lower reflector regions 2*c*, 2*d* in a predetermined direction onto the roadway in front of the vehicle.

The control unit processes vehicle sensor signals, determines from them the vehicle situation, and controls the screening device 4 correspondingly. By adjusting the screening device 4, the side dissipation or the pre-field dispersion can be steplessly varied.

While the invention has been illustrated and described as embodied in headlight arrangement for motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A headlight arrangement of a vehicle, comprising a reflector subdivided into a plurality of reflector regions; a light source arranged in a region of an apex of said reflector so that a light emitted by a light source is reflected by said reflector onto a roadway in front of the vehicle; at least one screening device associated with at least one of said reflector regions, said screening device being adjustable between a pass-through position in which the light emitted by said light source can reach a selected one of said reflector regions, and a screening position in which a light emitted by said light source is at least partially screened from reaching the selected one of said reflector regions; and a control unit which controls said screening device in dependence on vehicle sensor signals and adjusts said screening device between said pass-through position and said screening position in any vehicle situation with in a given lighting function to provide an optimal light distribution.

2. A headlight arrangement of a vehicle as defined in claim 1, wherein said screening device is formed so that in its screening-position it screens substantially the whole selected reflector region.

3. A headlight arrangement of a vehicle as defined in claim 1, wherein said screening device is formed as at least one substantially light-impermeable screens.

4. A headlight arrangement of a vehicle as defined in claim 3, wherein said screens is displaceable parallel to an optical axis of the headlight arrangement.

5. A headlight arrangement of a vehicle as defined in claim 3, wherein said screen is turnable about an optical axis of the headlight arrangement.

6. A headlight arrangement of a vehicle as defined in claim 3, wherein said screen is turnable about an axis extending parallel to an optical axis of the headlight arrangement.

7. A headlight arrangement of a vehicle as defined in claim 3, wherein said screen has a contour corresponding to a geometry of the selected reflector region, so that at least a certain part of the selected reflector region is covered by said screen in its screening position.

8. A headlight arrangement of a vehicle as defined in claim 7, wherein the whole selected reflector region is substantially covered by said screen in its screening position.

9. A headlight arrangement of a vehicle as defined in claim 1, wherein said screening device is formed as at least one reflecting reflector element.

10. A headlight arrangement of a vehicle as defined in claim 9, wherein said reflector element is turnable about an optical axis of the headlight arrangement.

11. A headlight arrangement of a vehicle as defined in claim 9, wherein said reflector element is tumable about an axis extending parallel to an optical axis of the headlight arrangement.

12. A headlight arrangement of a vehicle as defined in claim 11, wherein said reflector element in its pass-through position is arranged if front of at least one further reflector region, said reflector element being also formed so that in its screening position it is arranged in a direction of light rays emitted by said light source in front of said selected reflector region, and light rays oriented to said selected reflector region for optimization of a light distribution on the roadway in front of the vehicle are reflected by the at least one further reflector region onto the roadway in front of the vehicle.

13. A headlight arrangement of a vehicle as defined in claim 12, wherein said reflector element is formed so that the light oriented on said selected reflector region is directly reflected onto the roadway in front of the vehicle.

14. A headlight arrangement of a vehicle as defined in claim 12, wherein said reflector element is formed so that the light oriented on said selected reflector region is indirectly reflected by the at least one further reflector region on the roadway in front of the vehicle.

15. A headlight arrangement of a vehicle as defined in claim 1, wherein said light source is formed as a gas discharge lamp.

* * * * *